W. T. LAKIN.
AUTOMATIC STOPPING DEVICE FOR PHONOGRAPHS.
APPLICATION FILED FEB. 8, 1919.
1,412,472.
Patented Apr. 11, 1922.
3 SHEETS—SHEET 2.
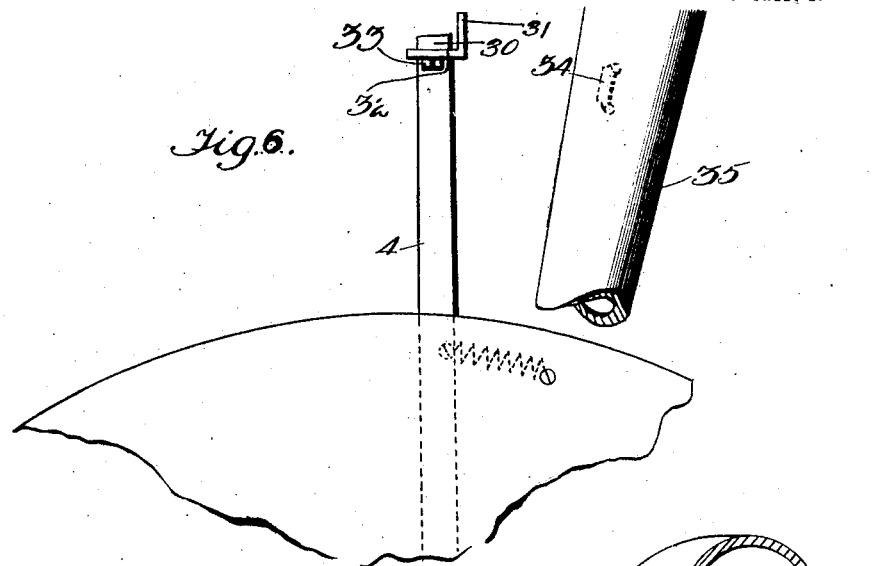
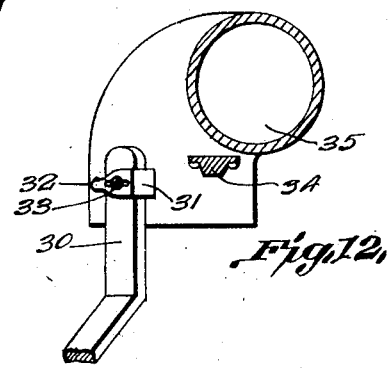
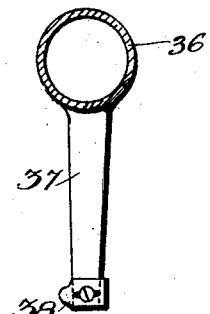
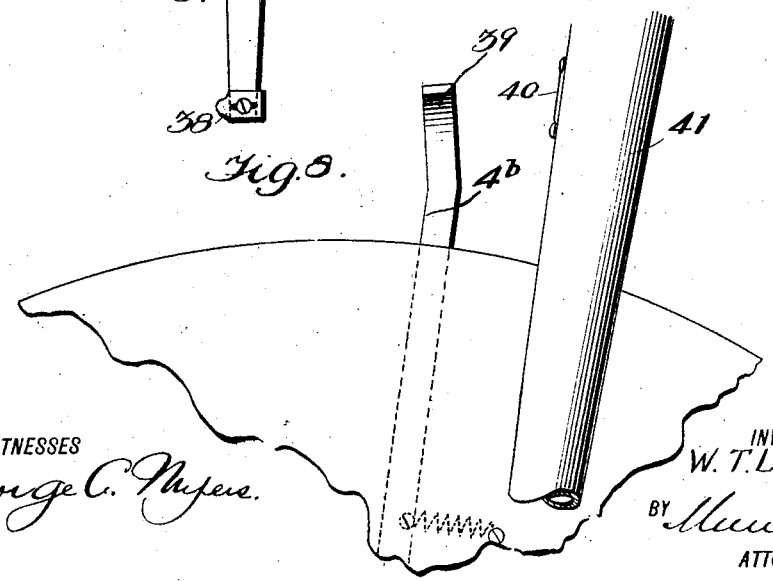
WITNESSES
George C. Myers.
INVENTOR
W. T. LAKIN,
BY
ATTORNEYS W. T. LAKIN.
AUTOMATIC STOPPING DEVICE FOR PHONOGRAPHS.
APPLICATION FILED FEB. 8, 1919.

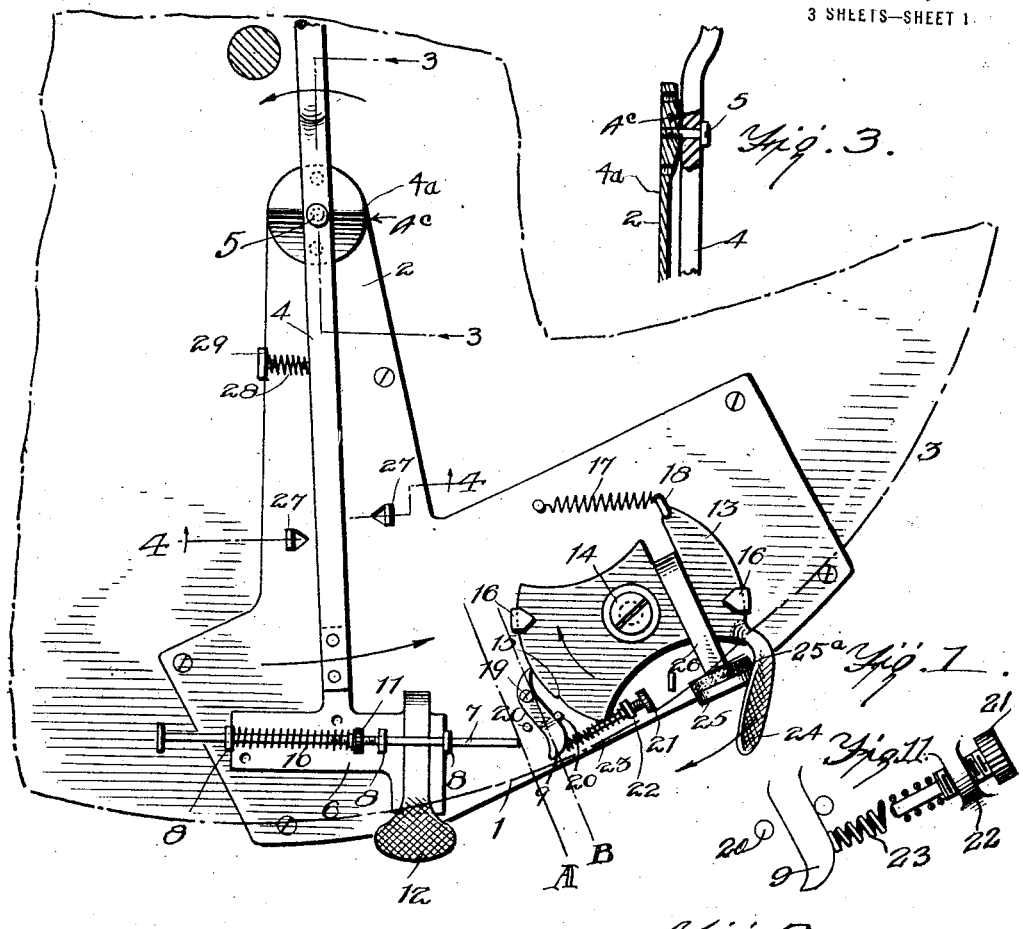

1,412,472.

Patented Apr. 11, 1922.

WITNESSES
Ralph Brauner.

INVENTOR
W. T. Lakin.
BY
ATTORNEYS

UNITED STATES PATENT OFFICE.

WILLIAM T. LAKIN, OF LONG, MARYLAND.

AUTOMATIC STOPPING DEVICE FOR PHONOGRAPHS.

1,412,472. Specification of Letters Patent. Patented Apr. 11, 1922.

Application filed February 8, 1919. Serial No. 275,816.

*To all whom it may concern:*

Be it known that I, WILLIAM T. LAKIN, a citizen of the United States, and a resident of Long, in the county of Allegany and State of Maryland, have invented certain new and useful Improvements in Automatic Stopping Devices for Phonographs, of which the following is a specification.

My invention is an improvement in automatic stopping devices for phonographs, and has for its object to provide a device of the character specified adapted to be arranged beneath the turntable, and having normally operative braking mechanism for engaging the turntable to stop the turning of the same and having means for restraining the operation of the braking means, arranged to be tripped by the reproducer when it has reached the point where it is desired to stop the operation of the phonograph to arrest the movement of the turntable.

In the drawings:

Figure 1 is a top plan view of one embodiment of the invention;

Figure 2 is an edge view;

Figures 3 and 4 are sections on the lines 3—3 and 4—4, respectively, of Figure 1;

Figure 5 is a top plan view of a modified construction of brake support;

Figure 6 is a partial bottom plan view of the turntable and tone arm;

Fig. 7 is a cross section of the tone arm showing the trip arm 37 (referred to below) in elevation.

Figure 9:
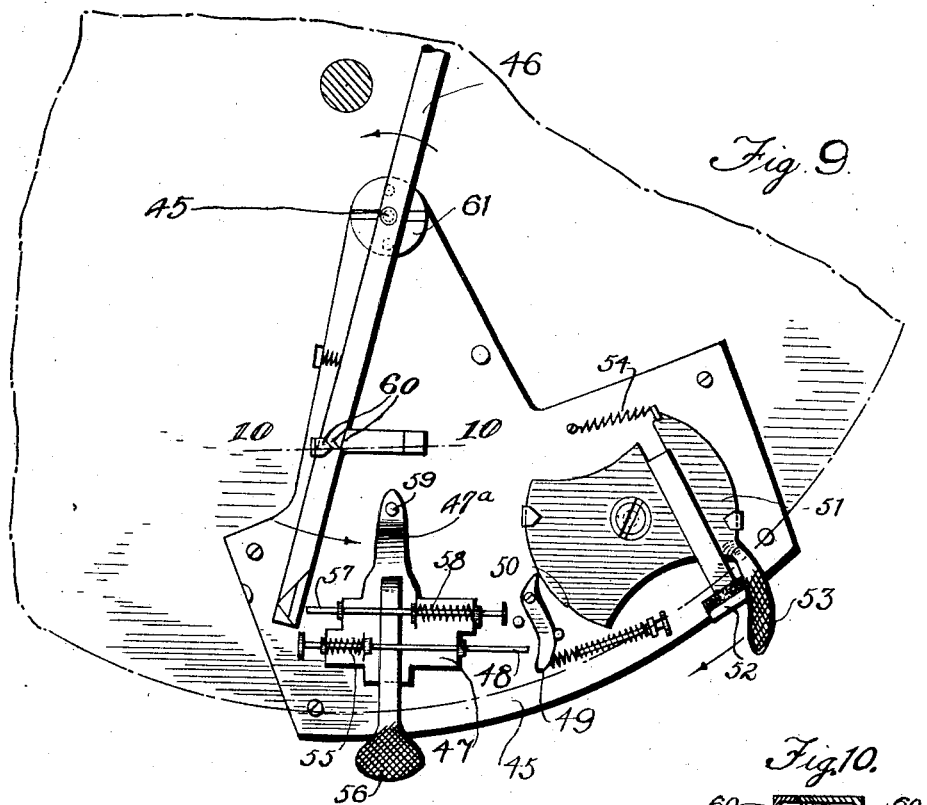

Figure 8 is a view similar to Figure 6, showing another embodiment;

Figure 9 is a partial top plan view showing another embodiment of the invention.

Figure 10:
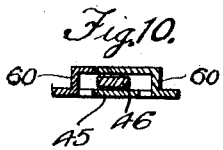
Figure 13:
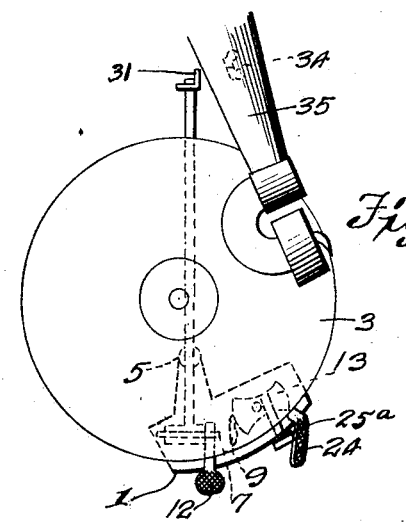

Figure 10 is a detail cross section on the line 10—10 of Figure 9,

Figure 11 is a detail view showing the adjustable feature of the spring 23,

Figure 12 is a detail sectional perspective view illustrating the operative relationship of the tone arm with the lever 4, and Figure 13 is a detail plan view showing the complete stop mechanism beneath the turntable.

In the construction of Figures 1 to 4, inclusive, a substantially L-shaped plate, consisting of a body 1 and a lateral arm 2, is secured to the base beneath the turntable 3 (which is indicated in dot and dash lines in Figure 1) by means of screws or the like, with the lateral arm extending toward the center of the turntable and with the body of the plate extending slightly beyond the edge of the turntable, as shown.

Upon this lateral arm is mounted a lever 4, the said lever being pivoted to the end of the arm as indicated at 5, in such manner that it may swing laterally and vertically. A transverse rib $4^c$ is provided on the upper face of the washer or head $4^a$ to which the arm is pivoted. The lever at the outer end has a cross head 6, and a trip rod 7 is mounted to move on the cross head transversely of the arm. This rod is supported in bearing lugs 8 on the head, and it is normally forced toward one end of a trip lever 9 by means of a spring which encircles the rod between one of the bearings 8 and a stop 11, the said stop being a nut threaded on to the rod. The rod has a head at the end remote from the trip lever, and it is normally held from movement under the influence of the spring by a resilient finger piece 12 which acts as a brake. This finger piece, which is integral with the inner edge of the cross head, is bent above the cross head outwardly, beyond the edge of the body 1 of the plate 1—2, and the finger piece has a head which is roughened as shown. The finger piece intermediate its ends bears against the rod and holds it from movement, but the rod may be easily released by pressing down on the head of the finger piece.

A brake supporting plate 13 is pivoted to the body 1 of the plate 1—2 adjacent to the trip lever 9, as indicated at 14, the pivotal connection being at approximately the center of the plate, and the plate is approximately rectangular having, however, its ends convex and its sides concave as shown in Figure 1. That edge adjacent to the trip lever 9 has a notch 15 for engagement by the end of the trip lever remote from the rod 7, and the plate is held from upward swinging movement at its ends, and is guided by overlying lugs 16 on the plate 1—2.

A spring 17 is arranged between the body 1 of the plate 1—2, and an eye 18 on the plate 13, and this spring normally acts to swing that end of the plate adjacent to the lever 9 outward. The lever 9 is pivoted at 19 to the plate 1—2, and it is limited in its swinging movement by stops 20 on the body of the plate. The lever 9 is pivoted nearer one end than the other and the pivotal connection is near that end which engages the brake supporting plate.

A spring 23 bears against that end of the lever adjacent to the rod 7, and that end of the spring remote from the lever is engaged by a screw 21, which is threaded through a lug 22 in the plate 1—2, and which enters the spring at the adjacent end. As shown in Figure 11, the base of the spring rests on the shoulder of the screw between the plain end within the spring and the threaded part in the lug. The plain part supports the spring, and the purpose of the spring is to keep the trip 9 in contact with the plate 13. A fingerpiece 24 extends outwardly from the brake supporting plate, said fingerpiece being roughened as shown, and the brake has a disk 25 on an arm 26 which is integral with the brake supporting plate. This disk may carry a shoe 25ª of leather or the like on its inner surface and is intended to engage the turntable to brake the same. The arm 26 is bent transversely of the brake supporting plate outwardly to bring the disk 25 to the outer edge of the turntable. The lever 4 before mentioned is limited in its swinging movement by stops 27 on the lateral arm 2, and a spring 28 is arranged between the lever and a lug 29 on the arm, the spring acting normally to force the end of the arm provided with the cross head toward the trip lever 9.

In the construction shown in Figure 6, that end of the lever 4 remote from the cross head has an angular portion 30 which has a movable stop lug 31. This stop lug has a portion 32 which extends to the opposite side of the angular portion of the arm, and the said portion is longitudinally slotted and the slot is engaged by a screw 33 which connects the lug to the angular portion. The lug is adapted to engage a wedge 34 on the under side of the tone arm, 35 (as shown in Figure 12) to operate the lever 4 and to provide an adjustment to compensate for the motion required to move the inner engaging end of the trip lever 9 from the notch 15 of the plate 13. When the finger is pressed on the head of the arm 12 the lever 4 is tilted enough to bear the cross head 6 upon the plate 1 releasing the trip rod 7 from the resilient arm of the finger piece, and enable the trip rod to be gauged to a releasing position when the head is next moved toward the right. Such right movement must end when the lug 31 meets the wedge 34. Thus when the needle in the reproducer traversing the grooves of the running record brings the tone arm back to the position gauged for above, the wedge 34 will bear against the edge of the lug 31 and by the time the wedge has exerted sufficient pressure through the trip 7 to release the engaging end of the trip lever 9 from the notch 15 it will have moved the lever 4 carrying the rod 7 over approximately a distance relatively equivalent to that shown between the points A and B.

As shown in Figure 7, the tone arm 36 may carry a depending arm 37 for engaging the lever 4, said arm having an adjustable lug 38 at its lower end, adjustable transversely of the arm 37 for engaging the arm 4. Or, as shown in Figure 8, the arm 4ᵇ which corresponds to the arm 4, may have merely an upturned portion 39 for engaging the abutment 40 of the tone arm 41. As shown in Figure 5, the brake supporting plate 42 corresponding to the plate 13 of Figure 1 and having a notch 43 for engagement by the trip, may have the brake arm 44 extend from the outer edge thereof instead of from the inner edge.

In operation, in order to stop at any desired point, the tone arm is so arranged that the needle will rest at this point in the groove of the record. Now, with a finger of the left hand pressing on the fingerpiece 12, the lever 4 is swung in a vertical plane until the upwardly offset end of the lever 4 at 31 engages the wedge 34 on the arm. A further pressure of the finger on the head of the arm 12 releases the rod 7, which is caused under the influence of the spring 10 to engage the outer end of the trip lever 9. This further pressure also tilts the lever 4, the play between the cross head and the plate 1—2 being only sufficient to permit the lug 31 on the lever to be brought into and out of position to engage the wedge 34. The brake supporting mechanism is now set, by swinging the element 24 toward the left. This puts the spring 17 under tension, and when the plate is swung far enough the trip lever 9 will engage the notch 15 and will hold the trip plate set with the brake disk out of contact with the edge of the turntable. The device is now ready for operation and the tone arm may be moved to bring the needle to the periphery of the record, i. e., to the starting point of the playing.

As the tone arm is moved inward toward the center of the record by the grooves, the tone arm will eventually reach the inner end of the lever 4, and the wedge engaging the same will swing the said lever, causing the rod 7 to trip the trip lever 9 to release the brake supporting plate and the brake disk 25 will be applied to the edge of the turntable, stopping the same. As is known, with the usual phonograph, generally there is no device provided to automatically stop the motor, and as a result when the record has been played the needle runs out of the grooves, producing very unpleasant grinding sounds. With the present invention, however, the turntable may stop when the record has been played, or it may be stopped at any point in the playing of the record.

In Figure 9 is shown another embodiment of the invention, wherein the braking mechanism is supported by a plate 45 similar to the plate 1—2. The lever 46 which corresponds to the lever 4 is pivoted to the plate 45. Instead of mounting the rod 48 (corresponding to the rod 7) directly on the lever 46, it is mounted on a plate 47, and this rod 48 is adapted to engage the trip lever 49 which is supported in the same manner as the lever 9 and is adapted to engage a notch 50 in the brake supporting plate 51. This plate which is in all respects similar to the plate 13 carrying the brake 52 and the finger piece 53, is normally acted upon to move the brake into operative position by a coil spring 54 corresponding to the spring 17 and is held from movement by the spring by the trip lever 49. The rod 48 is moved toward the trip lever by a spring 55, and is held from movement by a brake arm 56 similar to the fingerpiece 12 of Figure 1. In this arrangement the lever 46 co-operates with a second rod 57 which is mounted to move parallel with the rod 48 on the plate 47 and is normally spring pressed toward the lever by a coil spring 58.

This rod 57 is held in adjusted position by the brake arm 56 in the same manner that the rod 48 is held. With this arrangement, the rods 48 and 57 are so adjustable with respect to the plate 47 that the lever 46 will trip the lever 49 at the proper moment. A finer adjustment is permitted with this construction than with that shown in Figure 1. When the lever 46 engages the rod 57 the plate 47 which is pivoted at 59 to the plate 45 will swing, to cause the rod 48 to engage the trip lever, and the operation will be the same as described for Figure 1. Referring to Figure 10, it will be noted that the lugs 60 which limit the movement of the lever 46 overlie the said lever and form a guide to limit the upward swinging movement of that end of the same adjacent to the plate 47. Ordinarily, the lower portion of the plate 47 is slightly elevated above the plate 45 (being slightly bent as indicated at 47ª), and pressure on 56 to release rods 48—57 lowers said plate slightly, permitting a compensating adjustment with the lower upturned edge of lever 46 and rod 57. The tone arm shown in Figure 7 is adapted for use with a lever 4 having no upright portion and that in Figure 8 may be employed with the modification shown in Figure 9.

When the stopping position for the needle is nearer the center than the previous stopping point, no adjustment is necessary, the rod 7 providing for the difference. This rod is slidable and will compensate for any difference in position of the arm 4.

I claim:

1. In a phonograph, the combination with the turntable and the tone arm, of a brake supporting plate arranged beneath the table and carrying a brake, with a controlling spring adapted to move the brake into engaging position with the turntable to hold the same from movement, a trip lever for restraining the movement of the plate under the influence of the spring, and a lever pivoted intermediate its ends beneath the turntable and having one end in position for engagement by the tone arm to swing the lever, the other end having means adjustable with respect to the lever for engaging the trip lever to release the same, said last named means comprising a pin movable transversely of the lever and normally spring pressed toward the trip lever, and a releasable brake for engaging the pin to hold the same in adjusted position.

2. In a phonograph, the combination with the turntable and the tone arm, of a brake supporting plate arranged beneath the table and carrying a brake, with a spring adapted to move the brake into engaging position with the turntable to hold the same from movement, a trip lever for restraining the operation of said brake, and a lever pivoted intermediate its ends beneath the turntable and having one end in position for engagement by the tone arm to swing the lever, the other end having means adjustable with respect to the lever for engaging the trip lever to release the same.

3. In a phonograph, the combination with the turntable and the tone arm, of a brake supporting plate arranged beneath the table and carrying a brake, said plate being normally spring controlled to move the brake into engaging position with the turntable to hold the same from movement, a trip lever for restraining the movement of the plate under the influence of the spring, and means adjustable with respect to the turntable for engagement by the tone arm to swing the same and having means for releasing the trip lever when swung, said releasing means comprising a spring pressed pin movable with respect to the swinging means, and a brake for holding the pin in adjusted position.

4. In combination with a tone arm and turntable, means for braking the turntable, a wedge on the tone arm, means actuated by the wedge to release the brake at a predetermined time, and means associated with said actuated means adjacent the brake for gauging the actuating position of said means in respect to the wedge.

5. In combination with a tone arm having a wedge, a brake held from an adjacent turntable by a trip lever, a lever to be actuated at one end by said wedge to move the trip lever and release the brake, and means embodied in the other end of the actuating lever, adjustable in respect to the trip lever for gauging the position of the first end of the actuating lever in respect to the wedge.

6. Stop mechanism, comprising a brake, a trip lever engaging a part to normally hold the brake inoperative, a pivoted lever engageable at one end by a part of a tone arm at the extremity of inward movement of the latter, and a trip rod carried by the other end of the lever for engaging the trip lever at the end of said tone arm movement, including means normally holding the trip rod but through which it is set at various positions in respect to the trip lever.

7. In combination with a tone arm, a brake mechanism, a lever to be moved by a part of the tone arm, to in turn actuate a part of the brake to release the brake from a set position at a predetermined time, and a contactor carried by said lever, pre-set in respect to said movable brake part to produce the latter function.

8. In combination with a tone arm, a trip for holding a brake in the set position, a lever to be moved by part of a tone arm, and contactor means, including a trip rod, carried by the lever, pre-set in respect to the trip to engage the latter at the time for the release of the brake.

9. Stop mechanism, including a lever, a trip holding a brake in the set position, a projectable contactor for engaging the trip to release the brake, and means for detaining the contactor in a pre-set place in respect to the trip.

10. Stop mechanism, including a lever, a trip holding a brake in a set position, means carried by the lever for engaging the trip, including a trip rod projectable by pressure exerting means; and means checking said means at a predetermined position of projection by frictional engagement therewith.

11. In combination with a tone arm and turntable, a lever engageable by the tone arm to actuate a brake against the turntable, and a bearing for the lever on which it has lateral movement to engage the brake, and vertical movement to set the lever in respect to the brake.

12. In combination with a tone arm and turntable, a lever pivoted beneath the turntable to swing vertically for setting it in respect to a turntable-stopping brake, and horizontally to actuate said brake by an engagement by the tone arm, the end of the lever next to the tone arm being heaviest to normally lift the brake-actuating means.

WILLIAM T. LAKIN.

Witnesses:
THOMAS R. SMITH,
JNO. J. WINTERMEYER.